US008181842B2

(12) United States Patent
Schellekens et al.

(10) Patent No.: US 8,181,842 B2
(45) Date of Patent: May 22, 2012

(54) DEVICE FOR ASSEMBLY BY BRAZING AN END CAP ONTO A CYLINDRICAL BODY AND VACUUM CARTRIDGE COMPRISING ONE SUCH DEVICE

(75) Inventors: Hans Schellekens, La Terrasse (FR); Marie-Françoise Devismes, Bernin (FR); Dominique Mazzucchi, Jarrie (FR); Olga Kozlova, Montbonnot (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 0 days.

(21) Appl. No.: 12/923,445

(22) Filed: Sep. 22, 2010

(65) Prior Publication Data

US 2011/0084117 A1 Apr. 14, 2011

(30) Foreign Application Priority Data

Oct. 12, 2009 (FR) ..................................... 09 04867

(51) Int. Cl.
*B23K 37/00* (2006.01)

(52) U.S. Cl. ......................... 228/43; 228/44.7; 228/49.5

(58) Field of Classification Search ......................... None
See application file for complete search history.

(56) References Cited

U.S. PATENT DOCUMENTS 2,150,379 A * 3/1939 Kerschbaum ................. 200/222
3,171,519 A * 3/1965 Nolte ............................ 403/179
3,674,958 A * 7/1972 Attia et al. .................... 218/134
3,772,766 A * 11/1973 Ebendt ....................... 228/122.1
4,077,114 A * 3/1978 Sakuma .......................... 29/622
4,436,241 A 3/1984 Lipperts ........................ 228/124
4,481,390 A * 11/1984 Kashiwagi et al. ........... 218/134
4,500,383 A * 2/1985 Kashiwagi et al. ........... 156/285
4,537,743 A * 8/1985 Yamanaka et al. .............. 419/38
4,584,445 A * 4/1986 Kashiwagi et al. ........... 218/130
4,588,879 A * 5/1986 Noda et al. ..................... 218/127
4,795,866 A * 1/1989 Hoene et al. .................. 218/134
4,962,289 A * 10/1990 Stegmuller .................... 218/134
4,983,793 A * 1/1991 Stegmuller .................... 218/139
5,099,093 A * 3/1992 Schels et al. .................. 218/128
5,118,911 A * 6/1992 Yorita ........................... 218/136
5,152,449 A * 10/1992 Mizuhara ................... 228/124.1
5,222,651 A * 6/1993 Pilsinger et al. ........... 228/122.1
5,364,010 A * 11/1994 Mizuhara ................... 228/124.6
5,594,224 A * 1/1997 Tanimizu et al. ............. 218/134
5,687,472 A * 11/1997 Honma et al. .................. 29/622
2002/0092830 A1* 7/2002 Makino ......................... 218/118
2002/0130108 A1* 9/2002 Makino ......................... 218/118
2005/0199590 A1* 9/2005 Leusenkamp et al. ........ 218/118

(Continued)

FOREIGN PATENT DOCUMENTS

DE 3636966 A1 * 5/1987

(Continued)

*Primary Examiner* — Kiley Stoner
(74) *Attorney, Agent, or Firm* — Steptoe & Johnson LLP

(57) ABSTRACT

The present invention relates to a device for assembly by brazing an end cover onto a cylindrical body, said end cover presenting a circular peripheral rim via which said cover is brazed onto a part of one of the end surfaces of the cylindrical body, this device being characterized in that the above-mentioned cover is shaped in such a way that, on the above-mentioned end surface of the cylindrical body, the circular peripheral part of the above-mentioned cover exerts a compressive stress, after brazing, on substantially the whole contact area between the end surface of the cover and the end surface of the cylindrical body.

22 Claims, 2 Drawing Sheets

U.S. PATENT DOCUMENTS

| | | | | |
|---|---|---|---|---|
| 2005/0230138 | A1 * | 10/2005 | Makino | 174/50.5 |
| 2007/0007250 | A1 * | 1/2007 | Li | 218/134 |
| 2007/0090095 | A1 * | 4/2007 | Yoshida et al. | 218/118 |

FOREIGN PATENT DOCUMENTS

| | | | | |
|---|---|---|---|---|
| DE | 92 05 493 | | | 8/1993 |
| EP | 0 039 611 | | | 11/1981 |
| GB | 2182804 | A | * | 5/1987 |
| JP | 56-19833 | A | * | 2/1981 |
| JP | 64-30129 | A | * | 2/1989 |
| JP | 11-203996 | | | 7/1999 |
| JP | 2001-35326 | A | * | 2/2001 |
| WO | WO 03/056592 | | | 7/2003 |

* cited by examiner

DEVICE FOR ASSEMBLY BY BRAZING AN END CAP ONTO A CYLINDRICAL BODY AND VACUUM CARTRIDGE COMPRISING ONE SUCH DEVICE

BACKGROUND OF THE INVENTION

The present invention relates to a device for assembly by brazing an end cap or cover onto a cylindrical body, said end cover presenting a circular peripheral rim via which said cover is brazed onto a part of one of the end surfaces of the cylindrical body, and to a vacuum cartridge assembled by means of such an assembly device.

One of the problems relating to assembly by brazing parts of different nature in a furnace, such as a ceramic part with a metal part for example, is linked to the appearance of residual stresses in this assembly mainly due to the difference of the coefficients of expansion of the materials to be assembled. These residual stresses can lead to cracking of the assembly in the short or long term.

The document U.S. Pat. No. 4,436,241 describing a vacuum cartridge is known, said vacuum cartridge comprising a cylindrical body made from ceramic closed at its opposite two ends by an end cap made from stainless steel. These two end caps each present the form of a bowl comprising a free circular rim via which rims said covers are both brazed at the end onto an end surface of the cylindrical body.

Reactive brazing procures a strength that is 20% lower than conventional brazing. This type of brazing is therefore more difficult to perform on a cartridge design as described in the above-mentioned patent.

SUMMARY OF THE INVENTION

The present invention solves these problems and proposes an assembly device by brazing a cover onto a cylindrical body achieving an improved strength between the two parts, in particular enabling brazing of reactive type to be performed between the two parts, and also proposes a vacuum cartridge assembled according to this device.

For this purpose, the object of the present invention is to provide a device for assembly by brazing of the above-mentioned kind, this device being characterized in that said cover comprises, after the part thereof that is brazed onto the cylindrical body and in the direction of the central axis of the cylindrical body, a first part that is offset with respect to the above-mentioned end surface of the cylindrical body, in the direction of the outside of the cylindrical body, this first part being followed by a second part extending inside the cylindrical body, said first and second parts extending all around the axis of the cover, the above-mentioned cover being shaped in such a way that the circular peripheral part of the above-mentioned cover exerts a compressive stress on at least one third of the above-mentioned end surface of the cylindrical body after brazing.

According to a particular feature, said cover comprises, after its part that is brazed onto the cylindrical body and in the direction of the central axis of the cylindrical body, a first part that is offset with respect to the above-mentioned end surface of the cylindrical body, in the direction of the outside of the cylindrical body, this first part being followed by a second part extending inside the cylindrical body.

According to a particular feature, the first part comprises a portion extending substantially perpendicularly to the axis of the cylindrical body and forming the outer wall of the cover, and the second part comprises a portion extending substantially perpendicularly to the axis of the cartridge and forming the inner wall of the cover.

According to a particular embodiment, the depth of the second part of the cover, measured between the plane of the end surface of the cover and the plane of the outer surface of the portion constituting the inner wall of the above-mentioned cover, is greater than 6 mm, and the height of the first part of the cover, measured between the plane of the end surface of the cover and the plane of the inner surface of the above-mentioned portion called first portion constituting the outer wall of the cover, is smaller than 2 mm.

Advantageously this height is greater than 0.5 mm.

According to another embodiment, the depth of the second part of the cover, measured between the plane of the end surface of the cover and the plane of the outer surface of the portion constituting the inner wall of the above-mentioned cover is of any dimension, and the height of the first part of the cover, measured between the plane of the end surface of the cover and the plane of the inner surface of the above-mentioned portion called first portion constituting the outer wall of the cover, is greater than 2 mm.

According to another feature, the thickness E of the cover is smaller than 2.5 mm.

According to another feature, the cover is brazed flat onto the end surface of the cylindrical body.

According to a particular feature, the cover comprises, starting from the outer peripheral rim, an end portion called first portion brazed flat onto the end surface of the body of the cartridge, extending in a plane substantially perpendicular to the axis of the cartridge, followed by a portion called second portion, inclined with respect to this first portion by an angle $\beta$, which inclined portion is followed by a portion called third portion extending parallel to the first portion, which third portion is followed by another portion called fourth portion that is inclined with respect to the previous portion by an angle $\alpha$ comprised between 90° and 180°, which portion is followed by a last portion called fifth portion extending substantially perpendicularly to the axis of the cartridge.

According to another feature, the angle $\beta$ is comprised between 55° and 125°.

According to another feature, the area called first area of the end surface of the cylindrical body, which area being situated between each peripheral edge of said surface and the edge situated on the same side with respect to the end of the cover, of the brazing surface situated on said end surface, has a length of more than 1 mm.

According to another feature, this device comprises a means for preventing the brazing from creating bonds in an area of the end surface of the cover, called the second area, situated facing the above-mentioned area called first area of the end surface of the cylindrical body.

According to a particular embodiment, the area called first area is covered by an anti-wetting agent or the area called second area is covered by a localized oxidation to prevent the brazing from creating bonds in the latter area.

According to another feature, the braze is placed retracted with respect to the area where the brazing fillet is to be situated, the length of this retract being a function of the brazing diffusion rate at the brazing temperature and of the brazing time so that, at the end of brazing, said braze does not extend beyond the contact surface between the end surface of the cover and the end surface of the cylindrical body.

According to a particular feature, the brazing performed is of reactive type.

It is a further object of the present invention to provide a vacuum cartridge comprising a device for assembly by brazing comprising the above-mentioned features taken alone or in combination.

BRIEF DESCRIPTION OF THE DRAWINGS

But other advantages and features of the invention will become more clearly apparent from the following description which refers to the accompanying drawings given for non-restrictive example purposes only and in which.

DETAILED DESCRIPTION OF PREFERRED EMBODIMENTS

Figure 1:
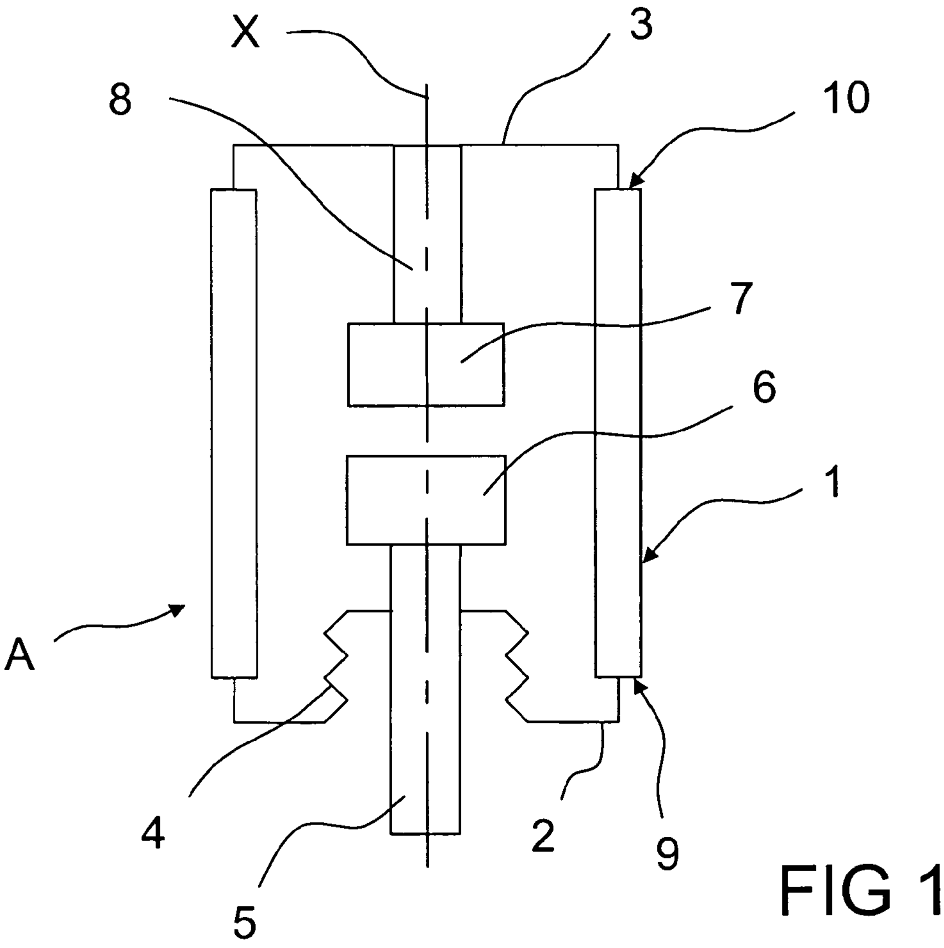
FIG. 1 is a schematic cross-sectional view of a vacuum cartridge according to the invention.

In FIG. 1, a vacuum cartridge A can be seen comprising, in a manner known as such, a cylindrical body 1 made from ceramic closed by two metal end covers 2,3, one 2 whereof, called first cover, comprises a bellows seal 4 fitted around an actuating rod 5 supporting the movable contact 6 of the cartridge. The stationary contact 7 of cartridge A is supported by a rod 8 fixed to the second end cover 3. The two end covers 2,3 are assembled respectively onto the two end surfaces 9,10 of the cylindrical body by means of an assembly device according to the invention.

According to this device of the invention, each end cover 2,3 is brazed onto the corresponding end surface 9, 10 of the body and is shaped such that said cover exerts a compression on the cylindrical body over the largest contact surface (or brazing surface 11) between said cover and said end surface.

Figure 2:
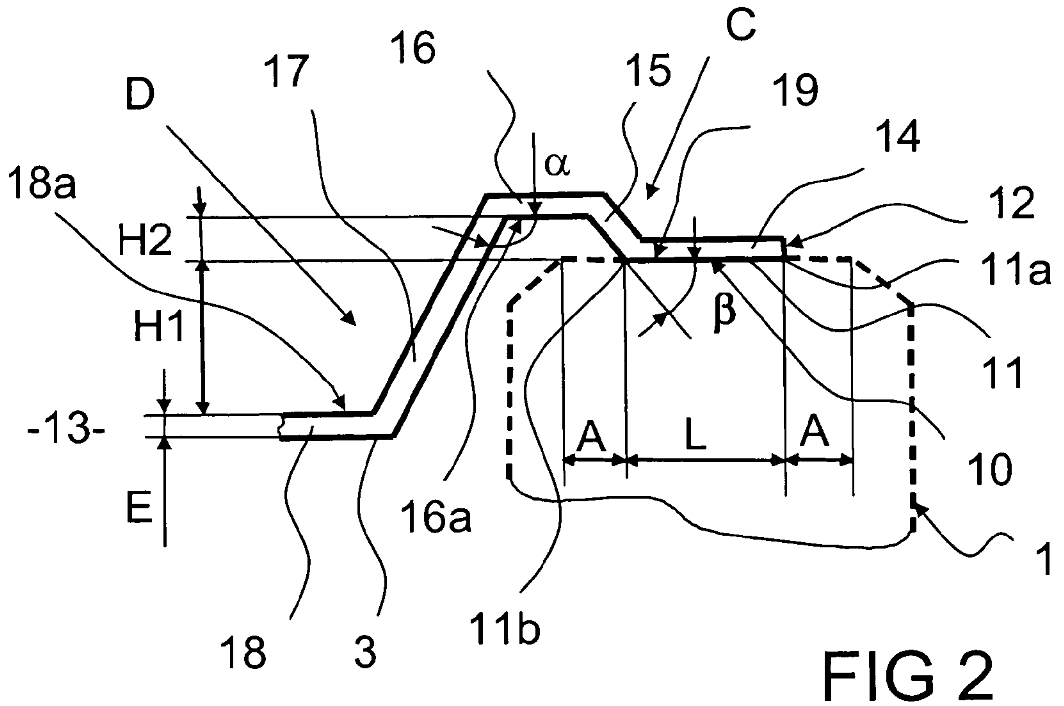
FIG. 2 is a partial cross-sectional view illustrating assembly of an end cover on a cartridge according to a particular embodiment of the device of the invention.

According to a particular embodiment of the invention illustrated in FIG. 2, end cover 3 comprises a first part C offset with respect to the above-mentioned end surface 10 of cylindrical body 1 in the direction of the outside of the cylindrical body, this first part C being followed by a second part D plunging inside cylindrical body 1.

Starting from the outer peripheral rim 12 to the centre 13, this cover 3 comprises an end portion called first portion 14, flat brazed onto end surface 10 of body 1 of the cartridge, said portion extending in a plane substantially perpendicular to the axis X of the cartridge, followed by a portion called second portion 15 inclined with respect to this first portion 14 by an angle β, which inclined portion 15 is followed by a portion called third portion 16 extending parallel to the first portion and forming the outer surface of cover 3, which portion 16 is followed by another portion 17 called fourth portion inclined with respect to the previous portion by an angle α comprised between 90° and 180°, which portion is followed by a last portion 18 called fifth portion, extending substantially perpendicularly to the axis of the cartridge constituting the inner wall of the cover and also the central part of the cover, angle β being advantageously comprised between 55° and 125°.

Depth H1 of second part D of cover 3, measured between the plane of brazing surface 11 situated on end surface 19 of the cover or on that 10 of the cylindrical body, and the plane of outer surface 18*a* of portion 18 called fifth portion of the cover, is greater than 6 mm.

Height H2 of first part C of cover 3, measured between brazing surface 11 and surface 16*a* directed towards the inside of cartridge A, of the above-mentioned third portion 16, is smaller than 2 mm. However, the braze must not rise up onto the cover, which imposes a minimum clearance height H2 min of 0.5 mm.

These values of H1 and H2 enable the maximum stresses to be absorbed by plastic deformation to induce the least stress possible in the ceramic.

These depth and height values are necessary to obtain a compressive effect on the body of the cartridge over the largest possible area of the brazing surface.

According to another advantageous solution enabling the same results to be obtained, H2>2 mm and H1 can be any value.

Thickness E of the cover is advantageously less than 2.5 mm.

The wetting angle on the ceramic is advantageously <90°. This results in the clearance angle β of the cover advantageously being comprised between 55° and 125°, which prevents the braze from rising up along the cover.

The cover has to be centered on the ceramic and be located at a sufficient distance from the rims of the ceramic body so that brazing fillets 11*a*,11*b*, which correspond to the ends of the brazed joints being situated in areas where the assembly is subjected to reduced residual stresses.

Figure 3:
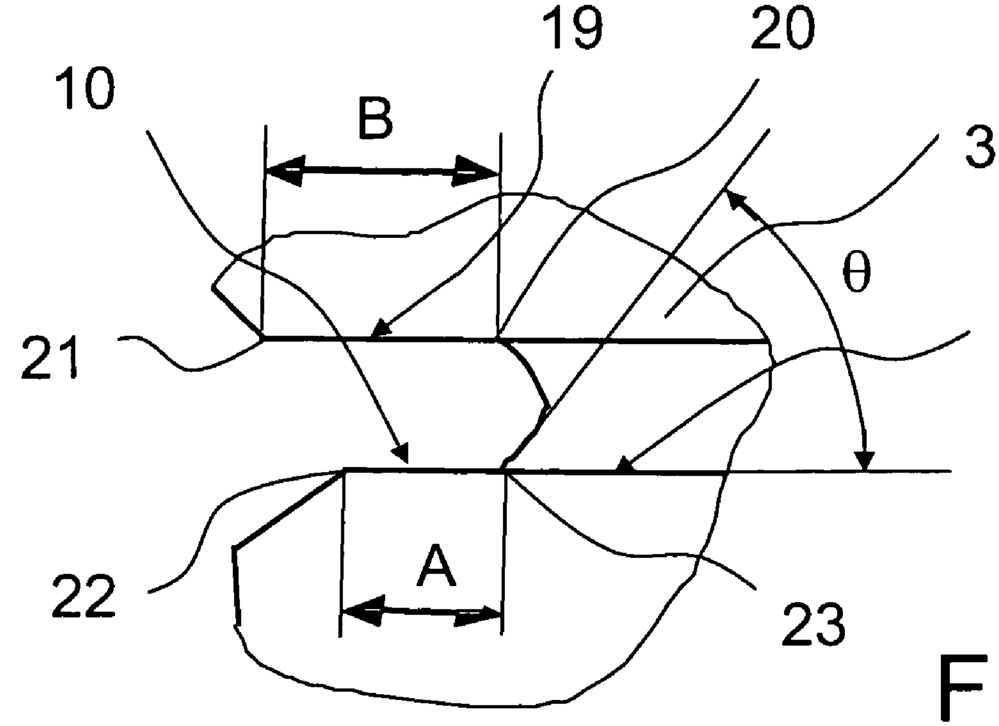
FIG. 3 is a detailed view illustrating a braze made between an end cover and a cylindrical body according to an embodiment of the device according to the invention.

Advantageously, as illustrated in FIG. 3, the distance A between each edge 23 of brazing surface 11 and edge 22 situated on the same side as end surface 10 of body 1 of the ceramic is advantageously greater than 1 mm.

According to a first embodiment, when assembly is performed, the braze is placed retracted with respect to the area where the brazing fillet will have to be situated, the length of this retract being dependent on the brazing diffusion rate at the brazing temperature.

In the case of brazing at 850° C.±30° C., the brazing diffusion rate is about one micron/second. Thus, for a brazing of about ten minutes, the braze will be offset by about 1 mm with respect to each end of the brazing surface.

Other solutions can be used such as the use of an anti-wetting solution deposited on area A of end surface 10 of cylindrical body 1 or performing localized oxidation on an area B (FIG. 3) of end surface 19 of cover 3, said area B being situated between end 20 of brazing surface 11 and corresponding edge 21 of end surface 19 of cover 3, so as to prevent the brazing from creating bonds in the areas of the ceramic body subjected to the tensile stresses.

Providing a clearance of height H2 comprised between 0.5 and 2 mm and an angle β comprised between 55° and 125° for the embodiment described in FIG. 2 prevents the braze from rising up along the cover.

Thus, according to the invention, the cover has been designed in such a way that the brazing surface is situated in an area subjected mainly to compressive stresses so that, should any cracks start to occur, the latter cannot propagate into the fragile material, i.e. the ceramic. Should a crack in fact start to appear in an area of the assembly subjected to tensile stresses, it can propagate, whereas if it starts to appear in an area subjected to compressive stresses, it does not propagate.

Furthermore, brazing fillets 11*a*,11*b* (ends of brazed joints) are points of the assembly from which cracks can begin to appear. It is therefore important to design the assembly for these brazing fillets to be situated in areas subjected to stresses that are as weak as possible and preferably compressive stresses, so that any cracks that may start to appear cannot propagate in the fragile material, i.e. the ceramic. If a crack does in fact start to appear in an area of the assembly that is "in tensile stress", it can propagate and lead to breaking, whereas if it occurs in an area in compressive stress, it does not propagate. This problem has been solved according to the invention either by offsetting the braze with respect to the location where it is to be situated, according to the brazing diffusion rate and the brazing time, or by depositing an anti-wetting agent on the cylindrical body, or by localized oxidation on an area of the cover, or a combination of these three solutions.

The present invention therefore proposes an assembly design which minimizes stresses and localizes the latter in areas where any cracks that may be initiated cannot propagate.

The present invention therefore enables the strength of an assembly by brazing, such as assembly of a metal with an oxide ceramic, to be improved so as to reduce the scrap rate and to provide an improvement in cases where the requirements for use are the most stringent (in particular in the case of molding from a casting, etc). This enables brazing of reactive type to be used which, in known manner, procures a lower strength than conventional brazing.

The invention applies to assembly of vacuum cartridges and, in general manner, to all assemblies that require a good tightness throughout their service lifetime.

The invention is naturally in no way limited to the embodiments described and illustrated which have been given for example purposes only.

On the contrary, the invention extends to encompass all the technical equivalents of the means described as well as combinations thereof if the latter are achieved according to the spirit of the invention.

The invention claimed is:

1. A device comprising:
- an end cover brazed onto a cylindrical body, said end cover comprising a circular peripheral rim brazed onto a part of an end surface of the cylindrical body,
- wherein said cover comprises a first part outside an interior of the cylindrical body and offset from the end surface of the cylindrical body and a second part within the interior of the cylindrical body, said first and second parts extending around a longitudinal axis of the cylindrical body wherein the circular peripheral rim of the cover exerts compressive stress on at least one third of the end surface of the cylindrical body after brazing,
- the first part comprises a first portion extending substantially perpendicular to the longitudinal axis of the cylindrical body and comprises an outer wall of the cover, and the second part comprises a second portion extending substantially perpendicular to the longitudinal axis of the cylindrical body and comprises an inner wall of the cover, and
- the distance between a plane defined by a top surface of the second portion and a plane defined by the end surface of the cylindrical body is greater than 6 mm, and the distance between a plane defined by a bottom surface of the first portion and a plane defined by the end surface of the cylindrical body is between 0.5 mm and 2 mm.

2. A device according to claim 1, wherein the thickness of the cover is smaller than 2.5 mm.

3. A device according to claim 1, wherein the cover is flat brazed onto the end surface of the cylindrical body.

4. A device according to claim 3, wherein the cover further comprises:
- a third portion, flat brazed onto the end surface of the cylindrical body, extending in a plane substantially perpendicular to the longitudinal axis of the body;
- a fourth portion extending from and inclined with respect to the third portion by a first angle, wherein the third portion is parallel to the first portion, and the first portion extends from the fourth portion; and
- a fifth portion extending from and declining with respect to the first portion by a second angle between 90° and 180°, wherein the second portion extends from the fifth portion.

5. A device according to claim 4, wherein the first angle is between 55° and 125°.

6. A device according to claim 1, wherein a first area of the end surface of the cylindrical body, between a first peripheral edge of the end surface and a first edge of the cover on the end surface, and a second area of the end surface, between a second peripheral edge of the end surface and a second edge of the cover on the end surface, each has a length of more than 1 mm, and the first peripheral edge is closer to the first edge of the cover than to the second edge of the cover, and the second peripheral edge is closer to the second edge of the cover than to the first edge of the cover.

7. A device according to claim 6, further comprising a means for preventing brazing from creating bonds in a second area of the end surface of the cylindrical body facing the first area of the end surface.

8. A device according to claim 7, wherein the first area is covered by an anti-wetting agent, or the second area is covered by a localized oxidation agent for preventing brazing from creating bonds in the second area.

9. A device according to claim 7, wherein the brazing is spaced a predetermined distance from an area where a filler metal is to be situated, the predetermined distance being a function of a brazing diffusion rate at a brazing temperature and time so that the brazing does not extend beyond a contact surface between the circular peripheral rim of the cover and the end surface of the cylindrical body.

10. A device according to claim 1, wherein the brazing is reactive.

11. A device according to claim 1, wherein the end cover and cylindrical body are parts of a vacuum cartridge.

12. A device comprising:
- an end cover brazed onto a cylindrical body, said end cover comprising a circular peripheral rim brazed onto a part of an end surface of the cylindrical body,
- wherein said cover comprises a first part outside an interior of the cylindrical body and offset from the end surface of the cylindrical body and a second part within the interior of the cylindrical body, said first and second parts extending around a longitudinal axis of the cylindrical body wherein the circular peripheral rim of the cover exerts compressive stress on at least one third of the end surface of the cylindrical body after brazing,
- the first part comprises a first portion extending substantially perpendicular to the longitudinal axis of the cylindrical body and comprises an outer wall of the cover, and the second part comprises a second portion extending substantially perpendicular to the longitudinal axis of the cylindrical body and comprises an inner wall of the cover, and
- the distance between a bottom surface a plane defined by a bottom surface of the first portion and a plane defined by the end surface of the cylindrical body is greater than 2 mm.

13. A device according to claim 12, wherein the thickness of the cover is smaller than 2.5 mm.

14. A device according to claim 12, wherein the cover is flat brazed onto the end surface of the cylindrical body.

15. A device according to claim 14, wherein-the cover further comprises:

a third portion, flat brazed onto the end surface of the cylindrical body, extending in a plane substantially perpendicular to the longitudinal axis of the body;

a fourth portion extending from and inclined with respect to the third portion by a first angle, wherein the third portion is parallel to the first portion, and the first portion extends from the fourth portion; and a fifth portion extending from and declining with respect to the first portion by a second angle between 90° and 180°, wherein the second portion extends from the fifth portion.

16. A device according to claim 15, wherein the first angle is between 55° and 125°.

17. A device according to claim 12, wherein a first area of the end surface of the cylindrical body, between a first peripheral edge of the end surface and a first edge of the cover on the end surface, and a second area of the end surface, between a second peripheral edge of the end surface and a second edge of the cover on the end surface, each has a length of more than 1 mm, and the first peripheral edge is closer to the first edge of the cover than to the second edge of the cover, and the second peripheral edge is closer to the second edge of the cover than to the first edge of the cover.

18. A device according to claim 17, further comprising a means for preventing brazing from creating bonds in a second area of the end surface of the cylindrical body facing the first area of the end surface.

19. A device according to claim 18, wherein the first area is covered by an anti-wetting agent, or the second area is covered by a localized oxidation agent for preventing brazing from creating bonds in the second area.

20. A device according to claim 18, wherein the brazing is spaced a predetermined distance from an area where a filler metal is to be situated, the predetermined distance being a function of a brazing diffusion rate at a brazing temperature and time so that the brazing does not extend beyond a contact surface between the circular peripheral rim of the cover and the end surface of the cylindrical body.

21. A device according to claim 12, wherein the brazing is reactive.

22. A device according to claim 12, wherein the end cover and cylindrical body are parts of a vacuum cartridge.

* * * * *